United States Patent
Garceau et al.

(10) Patent No.: US 7,249,754 B2
(45) Date of Patent: Jul. 31, 2007

(54) STABILIZER JACK

(75) Inventors: Bernard F. Garceau, Vandalia, MI (US); James D. McDonald, Union, MI (US); Jon M. Smith, Goshen, IN (US)

(73) Assignee: Norco Industries, Inc., Compton, CA (US)

( * ) Notice: Subject to any disclaimer, the term of this patent is extended or adjusted under 35 U.S.C. 154(b) by 172 days.

(21) Appl. No.: 10/535,866

(22) PCT Filed: Nov. 26, 2003

(86) PCT No.: PCT/US03/37774

§ 371 (c)(1),
(2), (4) Date: May 20, 2005

(87) PCT Pub. No.: WO2004/050532

PCT Pub. Date: Jun. 17, 2004

(65) Prior Publication Data

US 2005/0285090 A1    Dec. 29, 2005

Related U.S. Application Data

(60) Provisional application No. 60/429,508, filed on Nov. 27, 2002.

(51) Int. Cl.
*B60S 9/02* (2006.01)
*B60D 1/66* (2006.01)
*B66F 3/08* (2006.01)

(52) U.S. Cl. ..................... 254/424; 254/418

(58) Field of Classification Search ............... 254/424, 254/425, 418, 419, 126; 280/475, 765.1
See application file for complete search history.

(56) References Cited

U.S. PATENT DOCUMENTS

| 3,565,396 | A | 2/1971 | Spear |
| 3,826,470 | A | 7/1974 | Spear |
| 5,205,586 | A | 4/1993 | Tallman |
| D349,801 | S | 8/1994 | Few et al. |
| 5,348,330 | A | 9/1994 | Few et al. |
| D364,259 | S | 11/1995 | Garceau |
| 5,501,428 | A | 3/1996 | Garceau |
| 6,224,102 | B1 * | 5/2001 | Nebel ................ 280/765.1 |
| 6,494,487 | B1 * | 12/2002 | Nebel ................ 280/765.1 |

OTHER PUBLICATIONS

"20" and 24" Telescopic Stabilizing Jack for Use on Travel Trailers and 5th Wheel Trailers," BAL RV Products Group, 1993.

(Continued)

*Primary Examiner*—David B. Thomas
(74) *Attorney, Agent, or Firm*—Hahn Loeser & Parks, LLP; Michael H. Minns

(57) ABSTRACT

A stabilizing jack (10) for securement to the underside of a recreational vehicle. The jack includes a channel frame (25) formed with longitudinal trunnion flanges. A longitudinal screw (50) is rotatably mounted in the channel and drives a trunnion (38) that rides between the trunnion flanges (22a, 22b). A support leg (30) is rotatably connected to the trunnion. Rotation of the screw drives the trunnion towards an outboard end of the jack and lowers the support leg to its supporting position.

38 Claims, 8 Drawing Sheets

OTHER PUBLICATIONS

"20", 24" and 30" "T" Type Stabilizing Jack for Use on Travel Trailers and 5th Wheel Trailers," BAL RV Products Group, 1995.

"Light Trailer Stabilizing Jack for Use on Lightweight Travel Trailers and Tent Trailers," BAL RV Products Group, Mar. 1995.

"20-8-T "T" Type Stabilizing Jack for Use on Travel Trailers and 5th Wheel Trailers," BAL RV Products Group, 1993.

"Models 26150C through 26465U QTC Leveling Jacks for Use on Travel Trailers and 5th Wheel Trailers," BAL RV Products Group, 1998.

* cited by examiner

STABILIZER JACK

This application claims priority from U.S. provisional application Ser. No. 60/429,508, filed Nov. 27, 2002. Application Ser. No. 60/429,508 is hereby incorporated by reference.

BACKGROUND OF THE INVENTION

This invention relates generally to devices for stabilizing stationary recreational vehicles and more particularly to an improved stabilizer device mountable to the underside of such vehicle.

Recreational vehicles and trailers typically incorporate spring suspension systems mounted between the chassis frame and the wheels to provide a smooth ride during transit. While such suspension systems enhance passenger comfort and minimize vibration, they often detract from the stability of the passenger compartment when the vehicle is parked. For example, when passengers move about the compartment, the vehicle tends to rock both fore and aft as well as from side to side. Furthermore, this rocking motion is enhanced due to the inherent flexibility of the wheels and slight rolling thereof in response to forward and rearward weight shifting within the vehicle cabin.

The industry has addressed such vehicle stability concerns by developing various stabilizer jack devices and systems for use with the vehicles when stationary or parked. For example, such devices are disclosed in U.S. Pat. Nos. 3,565,396, 3,826,470, and 5,205,586.

One stabilizer jack device incorporates an elongated downwardly opening mounting channel formed with downwardly turned longitudinal marginal flanges. A cylindrical trunnion is formed with a transverse through a threaded bore for receipt of a drive screw rotatably mounted at one end of the mounting channel. The lateral opposite ends of the cylindrical trunnion pivotally mount a support leg extending longitudinally and downwardly therefrom. One end of a channel shaped strut has laterally spaced apart upwardly turned flanges and is pivotally mounted medially to the support leg and angles upwardly and longitudinally therefrom. A bracket at the opposite end of the mounting channel is formed with outwardly flared axle tabs for pivotally mounting to the opposite end of the strut. Difficulties with this stabilizer jack device were encountered in installed applications where the lateral flanges of the mounting channel and strut would spread laterally outwardly allowing the drive screw and strut to become racked and unbalanced in loading. This spreading of the upwardly turned flanges of the strut resulted in failure as the flanges slipped off of the axle tabs.

Another prior art jack device is a recreational vehicle stabilizer device having jack assemblies mounted at the laterally opposite extremities of telescopical jack housing channels for adjusting the stabilizer device to adapt to different width vehicles. While this device has enjoyed substantial commercial success, it is recognized that the stabilizing forces being directed through the jack housing to the vehicle frame allow for some degree of flex and play in the connections of such housing wherein the driving components of the jack assembly may rack or lock as weight is applied thereto from the interior of the vehicle. Furthermore, the jack assemblies resisted fore and aft longitudinal movement of the vehicle to only a minor extent. Thus, it was found that supplemental fore and aft restraint, supplied by for instance wheel blocks or chocks, was required.

In an effort to provide additional longitudinal restraint, other stabilizer devices provide a transverse frame member attached to the outer end of the jack housing and include angular extending support members attached between the lateral outer extremities of the transverse frame member and the jack assembly. Although these angular support members increase longitudinal stability, the additional components increase manufacturing costs, assembly time and complexity.

The foregoing illustrates limitations known to exist in present devices for stabilizing stationary recreational vehicles. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a jack for securement to the underside of a recreational vehicle, the jack comprising: a channel; an elongated screw rotatably mounted to the channel; a movable trunnion threadedly attached to the screw and slidably carried by the channel; an elongated support leg pivotally attached to the trunnion, the support leg having two sides connected by a bottom portion, and an open top between the two sides opposite the bottom portion, the support leg having a plurality of elongated strength enhancers therein; struts pivotally attached to the channel and to the support leg; and a foot attached to an end of the support leg.

In another aspect of the present invention, this is accomplished by providing a jack for securement to the underside of a recreational vehicle, the jack comprising: a channel, the channel having an upper central portion, downward extending bends extending from opposite sides of the upper central portion, a top trunnion flange extending outward from each downward extending bend, a side extending downward from each top trunnion flange, and a bottom trunnion flange extending inward from each side; an elongated screw rotatably mounted to the channel; a movable trunnion threadedly attached to the screw and slidably carried by the channel, the trunnion fitting between the channel top trunnion flanges and the channel bottom trunnion flanges, there being a clearance space between the trunnion and the channel upper central portion; a support leg pivotally attached to the trunnion, the support leg having two sides connected by a bottom portion, and an open top between the two sides opposite the bottom portion; struts pivotally attached to the channel and to the support leg; and a foot attached to an end of the support leg.

In another aspect of the present invention, this is accomplished by providing a jack for securement to the underside of a recreational vehicle, the jack comprising: a channel; an elongated screw rotatably mounted to the channel; a movable trunnion threadedly attached to the screw and slidably carried by the channel; a support leg pivotally attached to the trunnion, the support leg having a slot therein, the slot being proximate a lower end of the support leg; struts pivotally attached to the channel and to the support leg; and a foot having a tab extending therefrom, the tab fitting into the support leg slot and being permanently attached to the support leg.

In another aspect of the present invention, this is accomplished by providing a jack for securement to the underside of a recreational vehicle, the jack comprising: a channel; an elongated screw rotatably mounted to the channel; a movable trunnion threadedly attached to the screw and slidably carried by the channel; an elongated support leg pivotally attached to the trunnion, the support leg having two sides connected by a bottom portion, and an open top between the two sides opposite the bottom portion; struts pivotally attached to the channel and to the support leg; an insert positioned within the support leg proximate the attachment of the struts to the support leg; a foot attached to an end of the support leg; and a plurality of welds, the welds being only between the foot and the support leg and between sides of the insert and sides of the support leg.

In another aspect of the present invention, this is accomplished by providing a jack for securement to the underside of a recreational vehicle, the jack comprising: a channel; an elongated screw rotatably mounted to the channel; a movable trunnion threadedly attached to the screw and slidably carried by the channel; an elongated support leg pivotally attached to the trunnion, the support leg having two sides connected by a bottom portion, and an open top between the two sides opposite the bottom portion; struts pivotally attached to the channel and to the support leg; an insert positioned within the support leg proximate the attachment of the struts to the support leg; and a foot attached to an end of the support leg, wherein the support leg and the channel each have a thickness no greater than 10 gauge.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
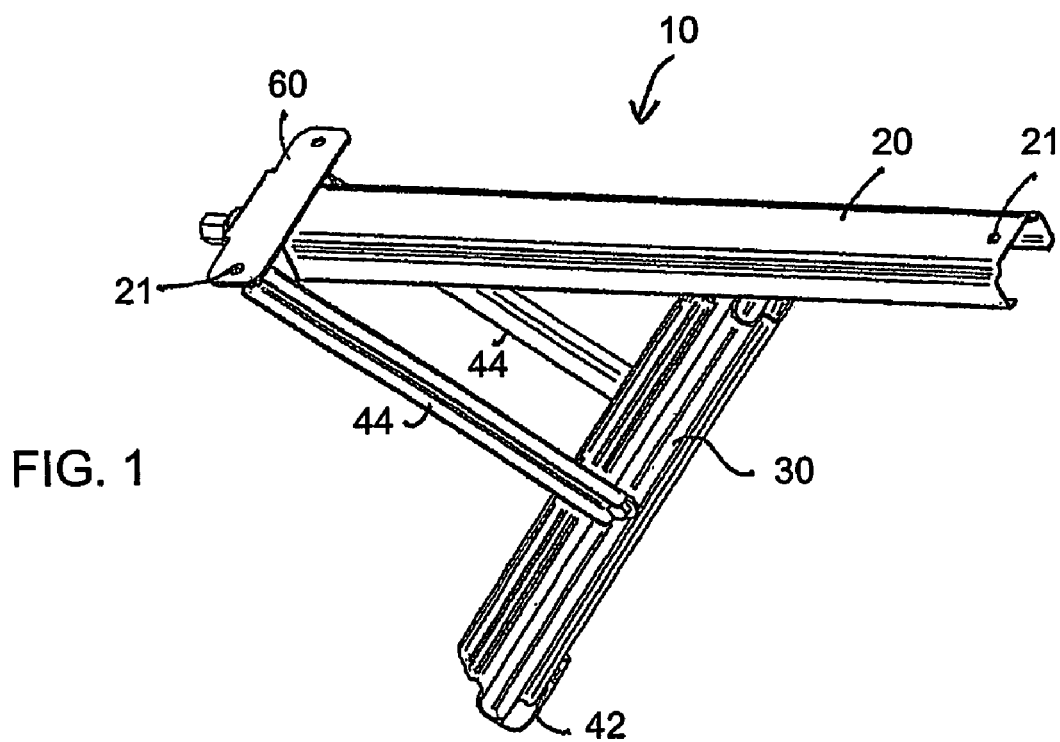
FIG. 1 is a perspective view of a stabilizer jack in an extended position according to an embodiment of the present invention.
Figure 2:
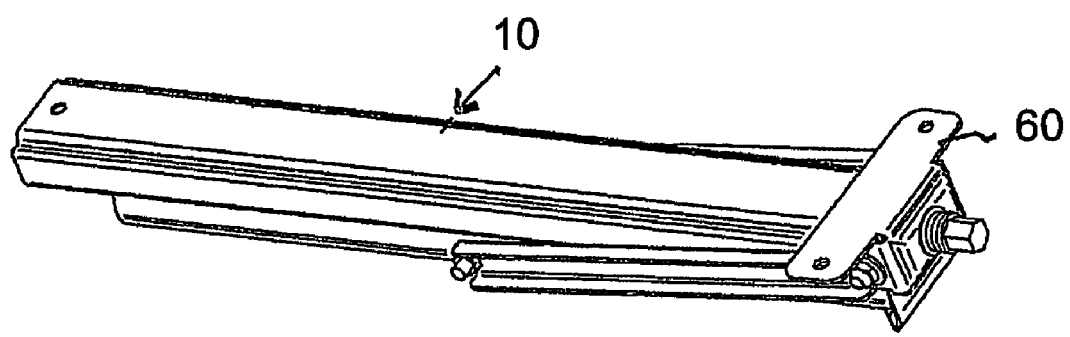
FIG. 2 is a perspective view of the stabilizer jack shown in FIG. 1, shown in a retracted position.
Figures 3, 4:
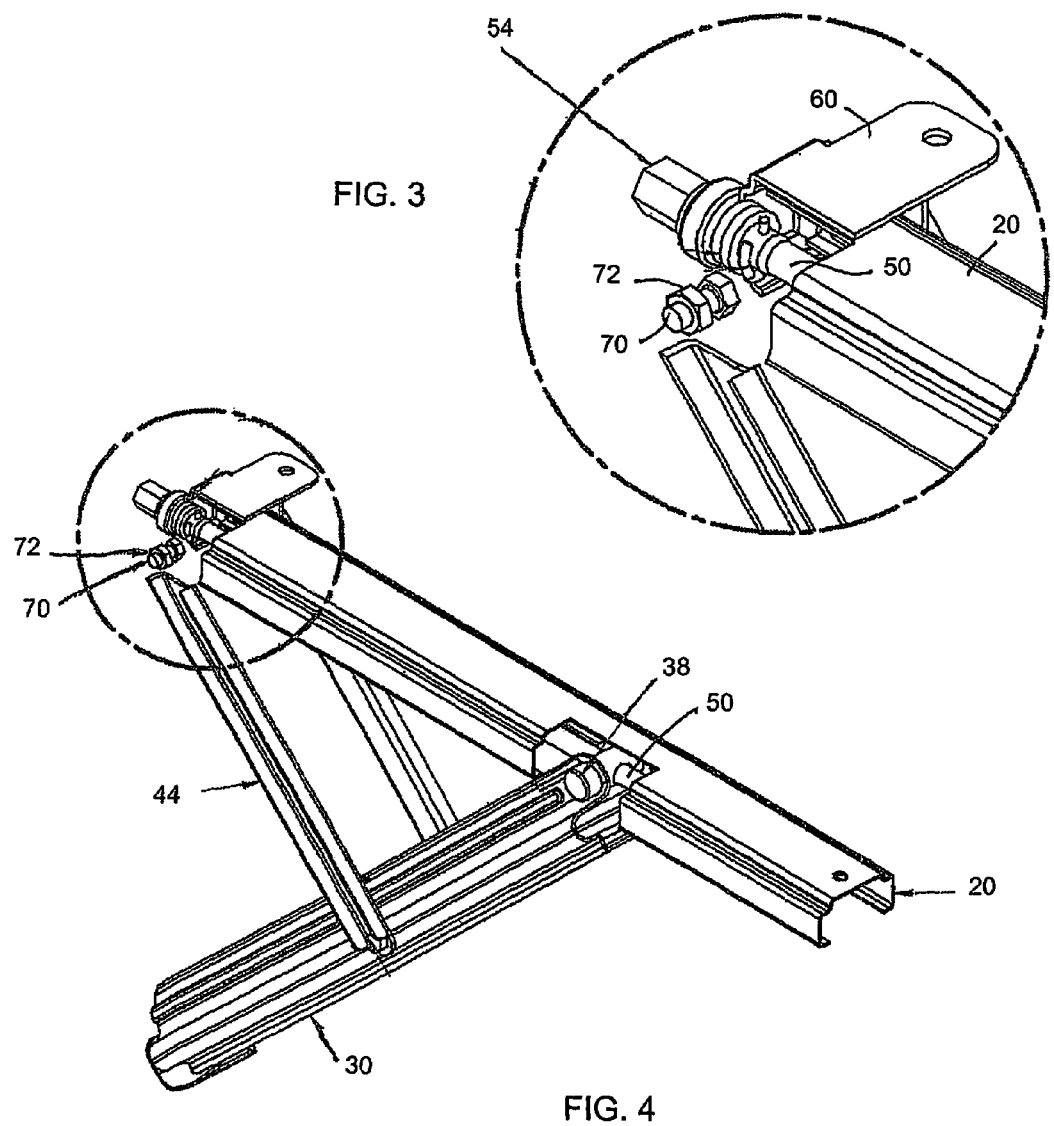
FIG. 3 is an enlarged view of the outboard end of the stabilizer jack shown in FIG. 1.
FIG. 4 is a perspective view of the stabilizer jack shown in FIG. 1, with portions of the channel cut away to show internal details.

FIGS. 1 and 2 show a stabilizer jack 10 according to the present invention. FIG. 1 shows the jack 10 in an extended or operative position and FIG. 2 shows the jack 10 is a retracted or stowed position. The stabilizer jack 10 provides against component flexing that can lead to racking of the frame and consequent failure under load. In addition the stabilizer jack 10 is reliable in use and comprises a minimum number of components, which reduces manufacturing costs and assembly time. Furthermore, the jack 10 is configured to minimize weight while providing strength and durability. Preferably, channel 20 and leg or support leg 30 are formed from no thicker than 10 gauge steel, rather than the typical 8 gauge steel. More preferably, channel 20 and leg 30 are formed from 12 or 13 gauge steel.

Stabilizer jack 10 includes a channel 20 with attached T-bracket 60 that have a plurality of mounting holes 21 for attaching jack 10 to a frame component of a recreational vehicle or trailer (not shown). Usually, one jack 10 is fastened to the recreational vehicle near each corner of the recreational vehicle.

The stabilizer jack 10 generally includes a mounting channel 20 with T-bracket 60 that supports a drive screw 50 and movable trunnion 38. Trunnion 38 has a threaded drive screw hole 40 extending radially through a mid-portion of the trunnion 38. Drive screw 50 threadedly engages threaded hole 40. A movable leg 30 is attached to channel 20 by trunnion 38. Side stays or struts 44 are pivotally attached to T-bracket 60 and a mid-point of leg 30. Foot pad 42 is attached to the free end of leg 30 and provides a ground support when the jack 10 is in the extended position. Foot pad 42 is preferably welded to leg 30 and helps prevent leg 30 from deflecting outward when under load. Foot pad 42 consists of a flat portion 80 and a curvilinear portion 81 with a tab 82 extending from the curvilinear portion. Tab 82 fits into a slot 43 in leg 30 and is welded to leg 30 on both sides of the tab 82. Preferably, this is the only connection between foot pad 42 and leg 30.

Figure 8:
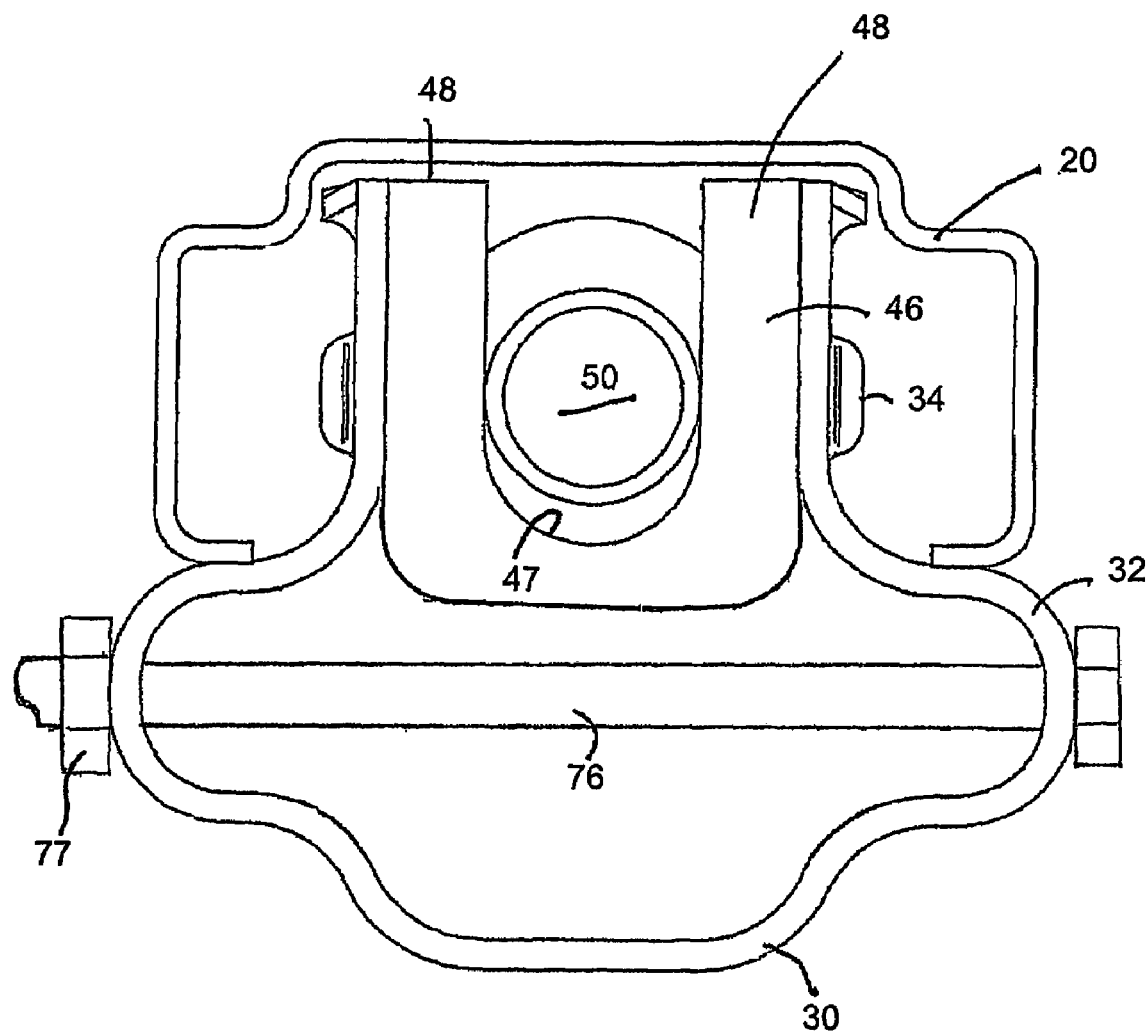
FIG. 8 is a cross-sectional view of the stabilizer jack showing an insert within the stabilizer jack leg.
Figure 9:
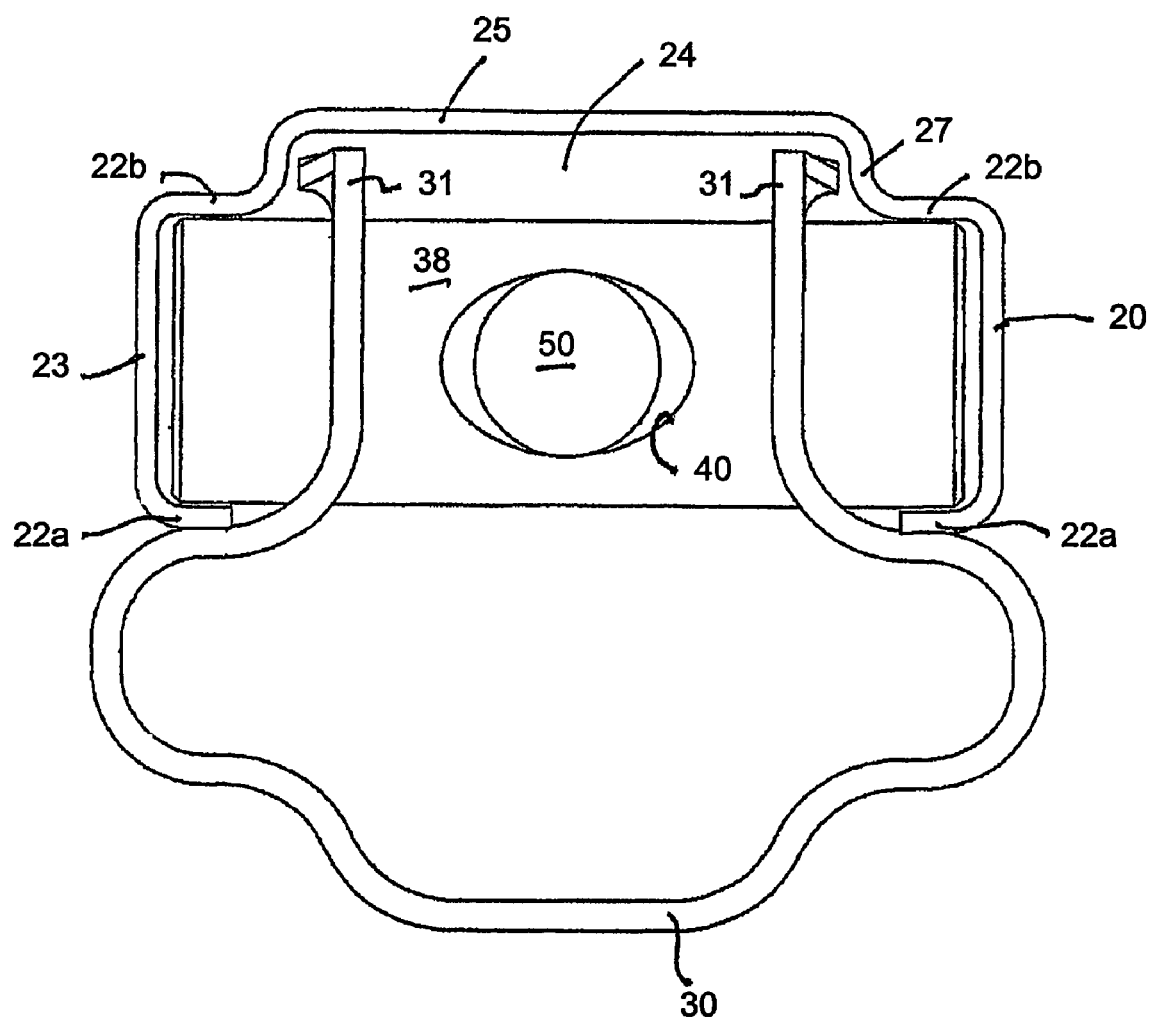
FIG. 9 is an end view of the stabilizer jack shown in FIG. 1.

Channel 20 is formed as an elongated downwardly facing channel (see FIGS. 8 and 9). Channel 20 includes a central upper mounting surface 25 with at least one mounting hole 21 for use in attaching channel 20 to the recreational vehicle. From the central upper surface 25, two downward bends 27 are formed. Next, outwardly extending top trunnion flanges 22b are formed, followed by downwardly extending sides 23 and then inwardly extending returns, or bottom trunnion flanges 22a. Flanges 22a, 22b provide support for and capture trunnion 38, as shown in FIG. 9. The bends 27 between upper surface 25 and flanges 22b provide additional strengthening to channel 20. In addition, these bends position upper surface 25 away from trunnion 38 and a clearance space 24 for the free ends 31 of leg 30 within channel 20, as shown in FIG. 8.

Figure 5:
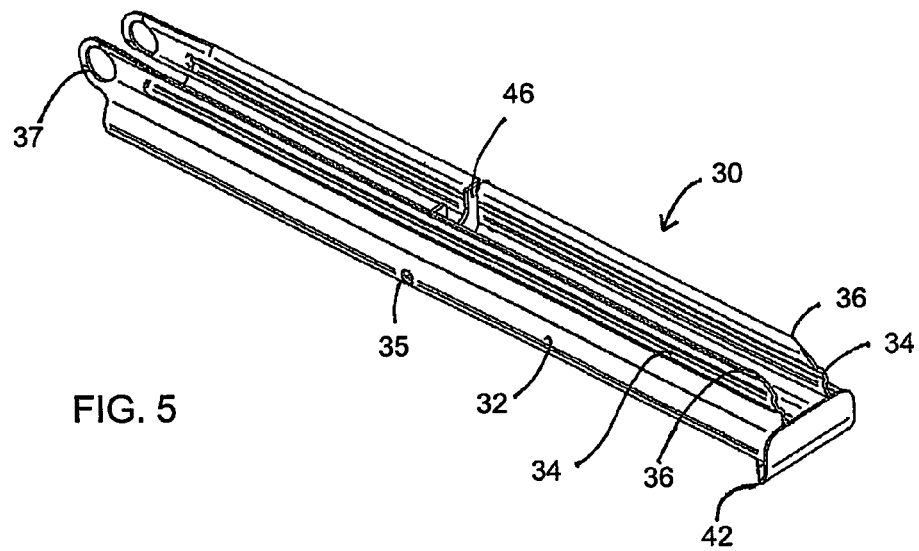
FIG. 5 is a perspective view of a stabilizer jack leg.
Figure 6:
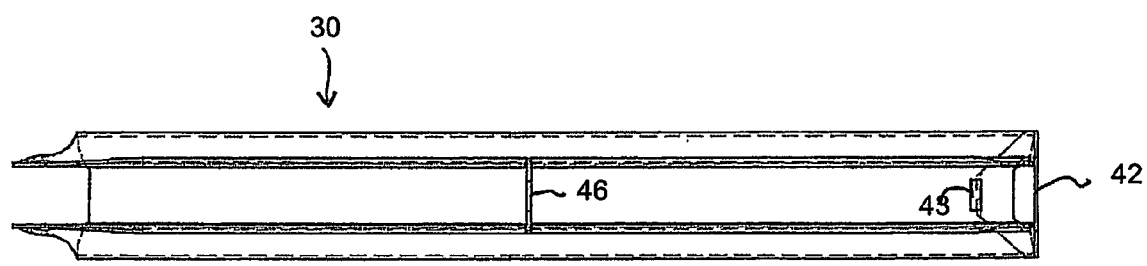
FIG. 6 is a top view of the stabilizer jack leg shown in FIG. 5.
Figure 11:
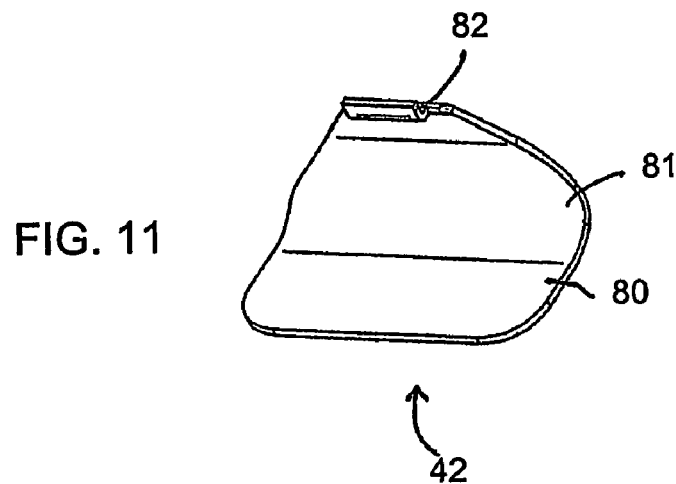
FIG. 11 is a perspective view of a foot pad.
Figure 7:
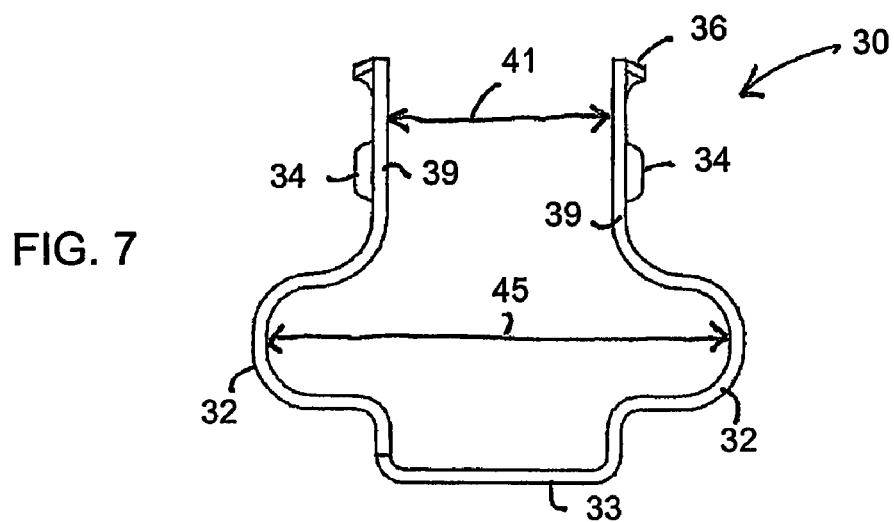
FIG. 7 is an end view of the stabilizer jack leg shown in FIG. 5.

Referring to FIGS. 5 through 7, leg 30 is generally formed as an elongated upwardly opening U-shaped channel. Leg 30 has a central portion consisting of two side lobes 32 that extend outwardly from a bottom 33 below the side lobes 32 and two sides 39 above the side lobes 32. An elongated reinforcement lobe or dimple 34 is formed in each leg side 39. In an upper end of leg 30, a trunnion hole 37 is formed in each side 39. As shown in FIG. 9, trunnion 38 fits into trunnion holes 37. The free longitudinal edges of side 39 are flared outward at 36. Outwardly extending flares 36 extend longitudinally from proximate the lower end of leg 30 to proximate the portion of leg 30 with trunnion holes 37 on both sides of leg 30. Because side lobes 32 extend outward from sides 39 and bottom 33, side lobes 32 strengthen leg 30. Sides 39 are positioned a first distance 41 from one another. Side lobes 32 are positioned a second distance 45 from one another. The second distance 45 is greater than the first distance 41. In addition, side lobes 32 extend outward from leg 30 a sufficient distance to permit side stays 44 to be attached to the outside of leg 30 without the use of additional spacers or bushings. Dimples 34 and flares 36 provide additional strengthening to leg 30. A pair of aligned side stay bolt holes 35 are formed in each side lobe 32 for attachment of side stays 44 to leg 30. Leg 30 can be used with other types of stabilizer jacks in addition to jack 10 of the present invention.

A U-shaped reinforcement insert 46 is provided within leg 30 proximate bolt holes 35. Preferably, insert 46 is positioned as close to bolt holes 35 as possible without interfering with leg bolt 76 when bolt 76 is inserted through bolt holes 35. Insert 46 preferably has two upwardly extending legs 48 with drive screw support slot 47 formed between legs 48. Insert 46 is welded to leg 30, preferably only adjacent the upper ends of legs 48. Insert 46 is positioned adjacent bolt holes 35 and leg bolt 76 to keep leg 30 from deforming inwardly when leg bolt 76 and leg bolt nut 77 are tightened to attach side stays 44 to leg 30. In addition to holding insert 46 in its desired position, the welding of insert 46 to leg 30 helps prevent outward bending of leg sides 39 when leg 30 is under compressive load. Preferably, only a single insert 46 is used.

The leg side lobes 32, reinforcement dimples 34, flares 36 along with the bends connecting the side lobes 32 to sides 39 and bottom 33 and reinforcement insert 46 strengthen leg 30 allowing thinner sheet metal, such as 12 or 13 gauge metal, to be used to form leg 30. The channel trunnion flanges 22a, 22b along with bends 27 forming the offset upper surface 25 of channel 20 strengthen channel 20 also allowing thinner sheet metal, such as 12 or 13 gauge metal, to be used to form channel 20.

A T-bracket 60 is attached to the outboard end of channel 20 and provides a fixed support for drive screw 50. The outboard end of drive screw 50 has a hex head 54 attached thereto or formed thereon. The threaded end of drive screw 50 is threaded into the trunnion threaded hole 40. Drive screw 50 can be adapted to be driven by a motor (not shown).

Figure 10:
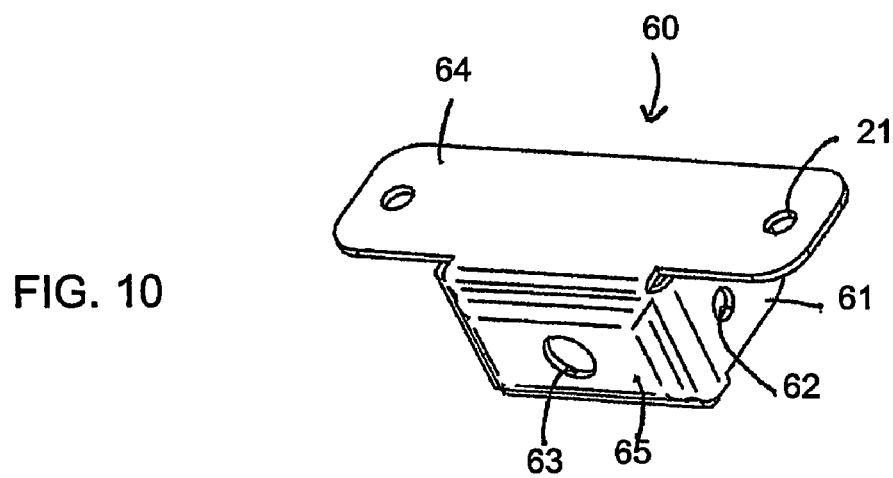
FIG. 10 is a perspective view of a T-bracket.
Figure 12:
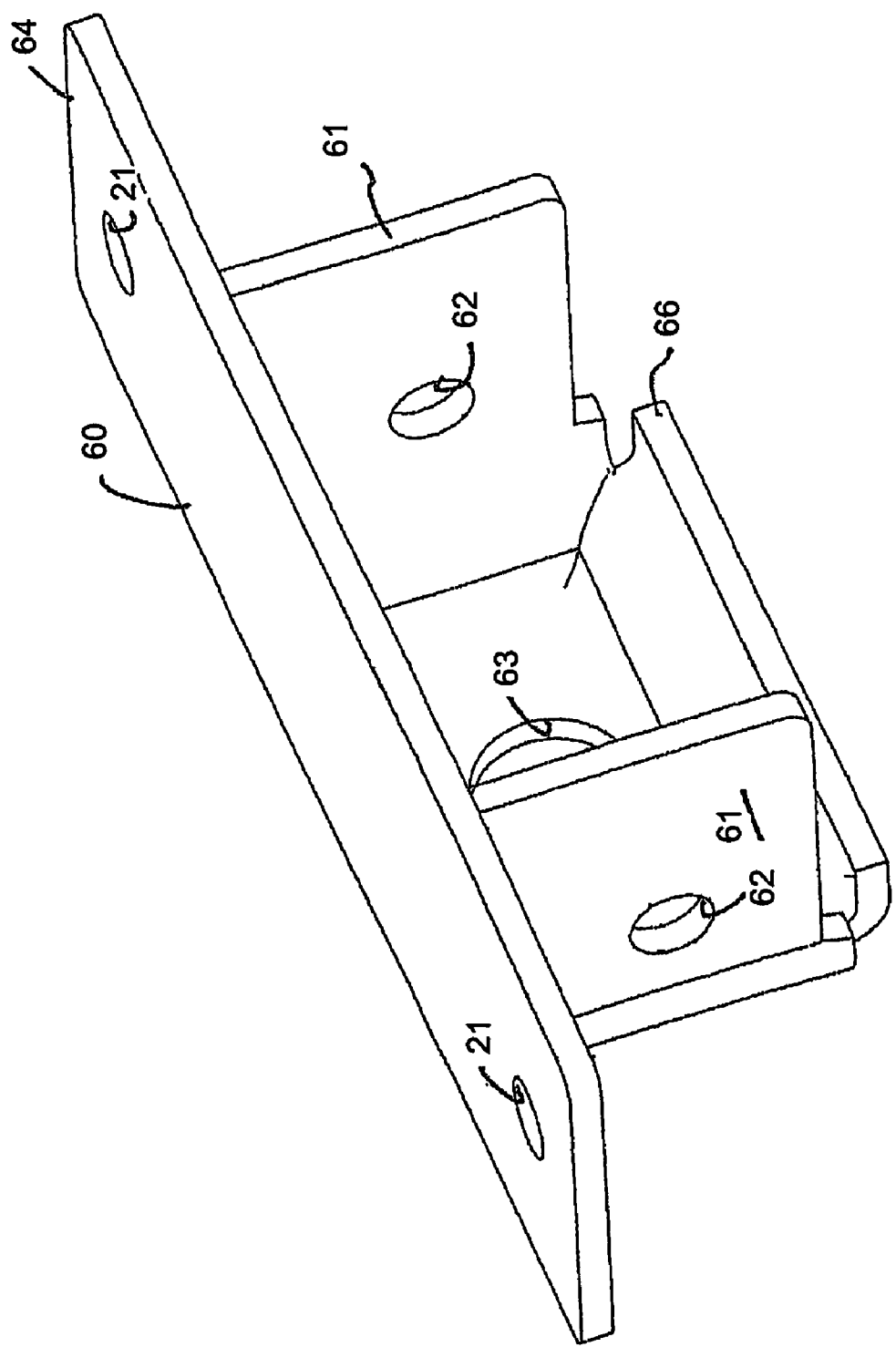
FIG. 12 is a perspective view of the T-bracket shown in FIG. 10.
Figure 13:
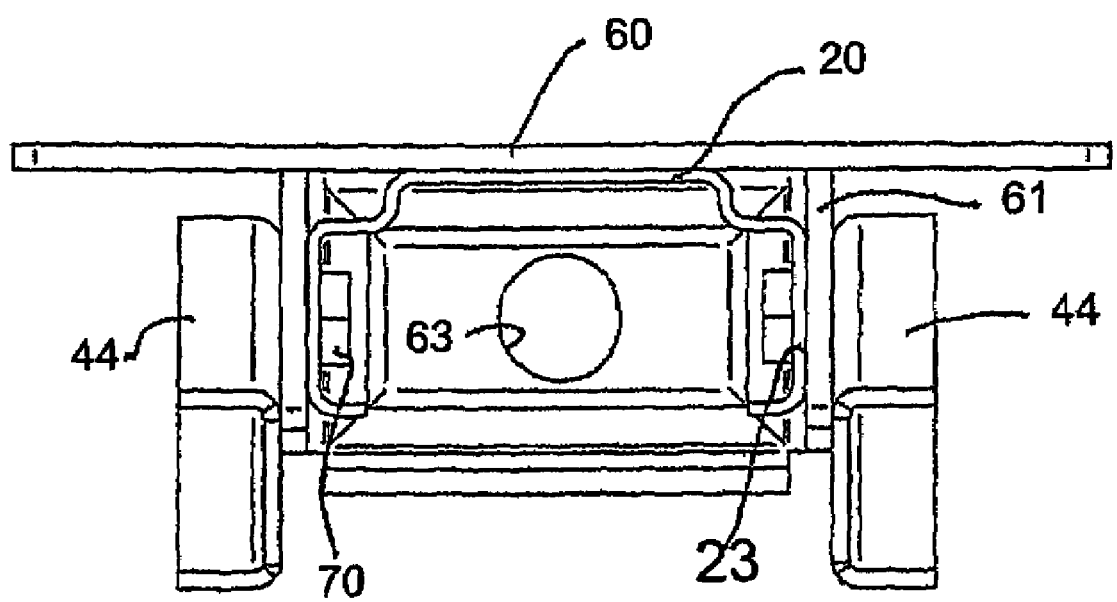
FIG. 13 is a schematic view of the T-bracket shown in FIG. 10 illustrating the attachment of the channel and side stays to the T-bracket.

As, shown in FIGS. 10 and 12, T-bracket 60 is formed from a single piece of unwelded sheet metal and has a drive screw hole 63 formed in the center of front 65. Front 65 is formed with a truncated pyramidal shape to strengthen T-bracket 60. Top 64 extends from front 65 and has a plurality of mounting holes 21 formed therein. Sides 61 also extend from front 65 and each side 61 has a bolt hole 62 formed therein. A bottom flange 66 extends from front 65. Bottom flange 66 preferably does not extend as far from front 65 at top 64 or sides 61. Bottom flange 66 is used to strengthen T-bracket 60. Referring to FIGS. 1 and 13, sides 61 of T-bracket 60 fit between sides 23 of channel 20 and side stays 44. Two side stay bolts 70 are inserted through bolt holes 62. Side stays 44, T-bracket 60 and channel 20 are fastened together only by bolts 70 and side stay nuts 71. Channel 20 holds the T-bracket 60 in place.

As shown in FIG. 8, when jack 10 is in the retracted position, drive screw 50 fits within drive screw support slot 47 in insert 46 with about a 1/16 inch clearance. Drive screw support slot 47 supports drive screw 50 when jack 10 is retracted to reduce flexing of drive screw 50 when the recreational vehicle is transported.

Preferably, the only welds used to form jack 10 are the three welds used to attach foot pad 42 to leg 30 and insert 46 to leg 30, one between tab 82 and leg 30, and one between each side of insert 46 and leg 30.

In use, when stabilizer jack 10 is in the retracted position, shown in FIG. 2, a tool with a hex socket (not shown) is attached to hex head 54 and drive screw 50 is rotated in a first direction. As drive screw 50 rotates, trunnion 38, which is threadedly engaged with drive screw 50, moves towards T-bracket 60, or outboard direction. As trunnion 38 moves outboard, the upper end of leg 30 also moves in the outboard direction. Because leg 30 is pivotally attached to channel 20 by both trunnion 38 and side stays 44, outboard movement of the upper end of leg 30 causes pivotally movement of side stays 44 and extension of the lower end of leg 30 to the extended position as shown in FIG. 1. Rotation of drive screw 50 in the other direction causes movement of trunnion 38 towards the inboard end of channel 20 and corresponding retraction of leg 30 to the retracted or stowed position shown in FIG. 2.

An alternate embodiment of stabilizer jack 10 (not shown) is a telescopic jack, similar to the multi-purpose stabilizer assembly shown in U.S. Pat. No. 5,205,586, hereby incorporated by reference. Telescopic jack consists of two jacks 10 wherein the channels 20 are telescopically connected and extend across the width of a recreational vehicle. One channel 20 fits telescopically within the other channel 20.

Having described the invention, what is claimed is:

1. A jack for securement to the underside of a recreational vehicle, the jack having an extended position and a retracted position, the jack comprising:

an elongated channel, the channel having an upper central portion, downward extending bends extending from opposite sides of the upper central portion, a top trunnion flange extending outward from each downward extending bend, a side extending downward from each top trunnion flange, and a bottom trunnion flange extending inward from each side;

a T-bracket attached to one end of the channel, the T-bracket comprising a folded unwelded sheet of metal;

an elongated screw rotatably mounted to the T-bracket;

a movable trunnion threadedly attached to the screw and slidably carried by the channel, the trunnion fitting between the channel top trunnion flanges and the channel bottom trunnion flanges, there being a clearance space between the trunnion and the channel upper central portion;

an elongated support leg pivotally attached to the trunnion, the support leg having:

two sides connected by a bottom portion, and an open top between the two sides opposite the bottom portion, the two sides being a first distance from one another;

each side including an elongated side lobe extending outward therefrom, the side lobes being a second distance from one another, the second distance being greater than the first distance;

an elongated reinforcement lobe in each side, the elongated reinforcement lobes being positioned between the side lobes and the open top;

an outward flare extending from an edge of each side proximate the open top; and a slot therein proximate a lower end of the support leg;

struts pivotally attached to the channel and T-bracket and to the support leg, sides of the T-bracket fitting between the struts and the channel, the T-bracket being attached to the channel only by fasteners attaching the struts to the T-bracket and the channel;

a U-shaped insert positioned within the support leg proximate the attachment of the struts to the support leg;

a foot having a tab extending therefrom, the tab fitting into the support leg slot and being permanently attached to the support leg; and a plurality of welds, the welds being only between the foot tab and the support leg, and between sides of the insert and sides of the support leg, the support leg and the channel each having a thickness no greater than 10 gauge.

2. A jack for securement to the underside of a recreational vehicle, the jack comprising:
a channel;
an elongated screw rotatably mounted to the channel;
a movable trunnion threadedly attached to the screw and slidably carried by the channel;
an elongated support leg pivotally attached to the trunnion, the support leg having two sides connected by a bottom portion, and an open top between the two sides opposite the bottom portion, the two sides being a first distance from one another, each side including an elongated side lobe extending outward therefrom, the side lobes being a second distance from one another, the second distance being greater than the first distance;
struts pivotally attached to the channel and to the support leg; and
a foot attached to an end of the support leg.

3. The jack according to claim 2, wherein the support leg further includes an elongated reinforcement lobe in each side, the elongated reinforcement lobes being positioned between the side lobes and the open top.

4. The jack according to claim 3, wherein an edge of each side proximate the open top is flared outward from each side.

5. The jack according to claim 2, wherein the struts are attached to an outside surface of the support leg side lobes.

6. The jack according to claim 5, further comprising an insert positioned within the support leg proximate the attachment of the struts to the support leg.

7. The jack according to claim 6, wherein the insert has a general U-shape.

8. The jack according to claim 7, wherein the jack has an extended position and a retracted position, the screw fitting within the insert when the jack is in the retracted position.

9. The jack according to claim 6, wherein the struts are attached to the support leg by a single bolt extending through the side lobes.

10. The jack according to claim 9, wherein the bolt is positioned proximate the insert.

11. The jack according to claim 10, wherein the insert extends from the open top of the support leg only partway towards the side lobes.

12. The jack according to claim 6, further comprising welds only between the foot and the support leg and between the insert and the support leg.

13. The jack according to claim 2, wherein the support leg has a thickness no greater than 10 gauge.

14. The jack according to claim 2, further comprising a T-bracket attached to one end of the channel.

15. The jack according to claim 14, wherein the T-bracket has a truncated pyramid shape.

16. A jack for securement to the underside of a recreational vehicle, the jack comprising: a channel; an elongated screw rotatably mounted to the channel; a movable trunnion threadedly attached to the screw and slidably carried by the channel; an elongated support leg pivotally attached to the trunnion, the support leg having two sides connected by a bottom portion, and an open top between the two sides opposite the bottom portion, the support leg having a plurality of elongated stiffening members therein; struts pivotally attached to the channel and to the support leg; and a foot attached to an end of the support leg.

17. The jack according to claim 16, wherein one of the elongated stiffening members comprises each side having an elongated side lobe extending outward therefrom, the sides being a first distance from one another, the side lobes being a second distance from one another, the second distance being greater than the first distance.

18. The jack according to claim 16, wherein one of the elongated stiffening members comprises an elongated reinforcement lobe in each side.

19. The jack according to claim 16, wherein one of the elongated stiffening members comprises the edge of each side proximate the open top being flared outward from each side.

20. The jack according to claim 16, further comprising an insert positioned within the support leg proximate the attachment of the struts to the support leg.

21. The jack according to claim 20, further comprising welds only between the foot and the support leg and between the insert and the support leg.

22. A jack for securement to the underside of a recreational vehicle, the jack comprising:
a channel, the channel having an upper central portion, downward extending bends extending from opposite sides of the upper central portion, a top trunnion flange extending outward from each downward extending bend, a side extending downward from each top trunnion flange, and a bottom trunnion flange extending inward from each side;
an elongated screw rotatably mounted to the channel;
a movable trunnion threadedly attached to the screw and slidably carried by the channel, the trunnion fitting between the channel top trunnion flanges and the channel bottom trunnion flanges, there being a clearance space between the trunnion and the channel upper central portion;
a support leg pivotally attached to the trunnion, the support leg having two sides connected by a bottom portion, and an open top between the two sides opposite the bottom portion;
struts pivotally attached to the channel and to the support leg; and
a foot attached to an end of the support leg.

23. The jack according to claim 22, wherein the jack has an extended position and a retracted position, the support leg sides fitting into the clearance space when the jack is in the retracted position.

24. The jack according to claim 22, further comprising an insert positioned within the support leg proximate the attachment of the struts to the support leg.

25. The jack according to claim 24, further comprising welds only between the foot and the support leg and between the insert and the support leg.

26. The jack according to claim 22, wherein the channel has a thickness no greater than 10 gauge.

27. A jack for securement to the underside of a recreational vehicle, the jack comprising:
a channel;
an elongated screw rotatably mounted to the channel;
a movable trunnion threadedly attached to the screw and slidably carried by the channel;
a support leg pivotally attached to the trunnion, the support leg having a slot therein, the slot being proximate a lower end of the support leg;
struts pivotally attached to the channel and to the support leg; and
a foot having a tab extending therefrom, the tab fitting into the support leg slot and being permanently attached to the support leg.

28. The jack according to claim 27, wherein the foot is permanently attached to the support leg only by the permanent attachment of the tab to the support leg slot.

29. A jack for securement to the underside of a recreational vehicle, the jack comprising:
a channel;
an elongated screw rotatably mounted to the channel;
a movable trunnion threadedly attached to the screw and slidably carried by the channel;
an elongated support leg pivotally attached to the trunnion, the support leg having two sides connected by a bottom portion, and an open top between the two sides opposite the bottom portion;
struts pivotally attached to the channel and to the support leg;
an insert positioned within the support leg proximate the attachment of the struts to the support leg;
a foot attached to an end of the support leg; and
a plurality of welds, the welds being only between the foot and the support leg and between sides of the insert and sides of the support leg.

30. The jack according to claim 29, wherein the plurality of welds comprises four and only four welds, two welds being between the foot and the support leg and two welds being between sides of the insert and sides of the support leg.

31. The jack according to claim 29, wherein the support leg and the channel each have a thickness no greater than 10 gauge.

32. A jack for securement to the underside of a recreational vehicle, the jack comprising:
a channel;
an elongated screw rotatably mounted to the channel;
a movable trunnion threadedly attached to the screw and slidably carried by the channel;
an elongated support leg pivotally attached to the trunnion, the support leg having two sides connected by a bottom portion, and an open top between the two sides opposite the bottom portion;
struts pivotally attached to the channel and to the support leg;
an insert positioned within the support leg proximate the attachment of the struts to the support leg; and
a foot attached to an end of the support leg,
wherein the support leg and the channel each have a thickness no greater than 10 gauge.

33. A jack for securement to the underside of a recreational vehicle, the jack comprising:
a channel;
a T-bracket attached to one end of the channel, the T-bracket comprising a folded unwelded sheet of metal;
an elongated screw rotatably mounted to the T-bracket;
a movable trunnion threadedly attached to the screw and slidably carried by the channel;
an elongated support leg pivotally connected to the trunnion; and
struts pivotally attached to the T-bracket and the channel and to the support leg,
the sides of the T-bracket fitting between the struts and the channel.

34. The jack according to claim 33, wherein the T-bracket is attached to the channel only by fasteners attaching the struts to the T-bracket and to the channel.

35. The jack according to claim 34, further comprising:
a foot attached to an end of the support leg.

36. The jack according to claim 35, further comprising welds only between the foot and the support leg and between an insert, the insert being positioned within the support leg proximate the attachment of the struts to the support leg and the support leg.

37. A jack for securement to the underside of a recreational vehicle, the jack comprising:
a channel;
a T-bracket attached to one end of the channel, the T-bracket comprising a folded unwelded sheet of metal, the T-bracket having a truncated pyramid shape;
an elongated screw rotatably mounted to the T-bracket;
a movable trunnion threadedly attached to the screw and slidably carried by the channel;
an elongated support leg pivotally connected to the trunnion; and
struts pivotally attached to the T-bracket and the channel and to the support leg.

38. A jack for securement to the underside of a recreational vehicle, the jack comprising:
a channel;
a T-bracket attached to one end of the channel, the T-bracket comprising a folded unwelded sheet of metal;
an elongated screw rotatably mounted to the T-bracket;
a movable trunnion threadedly attached to the screw and slidably carried by the channel;
an elongated support leg pivotally connected to the trunnion;
struts pivotally attached to the T-bracket and the channel and to the support leg, sides of the T-bracket fitting between the struts and the channel, the T-bracket being attached to the channel only by fasteners attaching the struts to the T-bracket and the channel;
an insert positioned within the support leg proximate the attachment of the struts to the support leg;
a foot attached to an end of the support leg; and
welds only between the foot and the support bracket and between the insert and the support leg.

* * * * *